United States Patent
Zholudev et al.

(10) Patent No.: US 9,942,362 B2
(45) Date of Patent: Apr. 10, 2018

(54) TRACKING DOWNLOADABLE ELECTRONIC FILES

(71) Applicant: RESEARCHGATE CORPORATION, San Francisco, CA (US)

(72) Inventors: Vyacheslav Zholudev, Berlin (DE); Michael Häusler, Berlin (DE); Horst Fickenscher, Berlin (DE); Ijad Madisch, Berlin (DE); Darren Alvares, Berlin (DE); Tim Einfeldt, Berlin (DE); Volker Dusch, Berlin (DE)

(73) Assignee: ResearchGate Corporation, San Franciso, CA (US)

( * ) Notice: Subject to any disclaimer, the term of this patent is extended or adjusted under 35 U.S.C. 154(b) by 0 days.

(21) Appl. No.: 15/173,233

(22) Filed: Jun. 3, 2016

(65) Prior Publication Data
US 2016/0360012 A1 Dec. 8, 2016

Related U.S. Application Data

(60) Provisional application No. 62/171,166, filed on Jun. 4, 2015.

(51) Int. Cl.
*G06F 15/16* (2006.01)
*H04L 29/06* (2006.01)
*H04L 29/08* (2006.01)

(52) U.S. Cl.
CPC .......... *H04L 67/42* (2013.01); *H04L 65/4084* (2013.01); *H04L 67/02* (2013.01); *H04L 67/1095* (2013.01); *H04L 67/20* (2013.01); *H04L 67/22* (2013.01); *H04L 67/2833* (2013.01); *H04L 67/306* (2013.01)

(58) Field of Classification Search
CPC ....................................................... H04L 67/22
USPC ................................................. 709/203, 217
See application file for complete search history.

(56) References Cited

U.S. PATENT DOCUMENTS

| | | | | |
|---|---|---|---|---|
| 2006/0265495 | A1* | 11/2006 | Butler | G06F 17/30899 709/224 |
| 2008/0222295 | A1* | 9/2008 | Robinson | G06F 17/30867 709/227 |
| 2009/0013414 | A1* | 1/2009 | Washington | G06F 21/10 726/32 |
| 2011/0055934 | A1* | 3/2011 | Koka | G06F 21/10 726/28 |
| 2013/0103740 | A1* | 4/2013 | Tully | H04N 21/251 709/203 |
| 2015/0113126 | A1* | 4/2015 | Fluehr | G06F 11/006 709/224 |
| 2015/0248387 | A1* | 9/2015 | Mattingly | G06F 17/241 715/230 |

* cited by examiner

*Primary Examiner* — Jason Recek
(74) *Attorney, Agent, or Firm* — Schwegman Lundberg & Woessner, P.A.

(57) ABSTRACT

Client requests for electronic files (e.g., requests for download from a website) can be leveraged by augmenting the electronic files with unique identifiers and/or enriching (e.g., dynamic) content, and tracking distribution or usage of the files based on network requests associated with the electronic files, such as attempts to upload a previously downloaded file or content requests originating from links included in the augmented electronic files.

19 Claims, 9 Drawing Sheets

TRACKING DOWNLOADABLE ELECTRONIC FILES

CROSS-REFERENCE TO RELATED APPLICATION

This application claims priority to and the benefit of U.S. Provisional Application No. 62/171,166, filed on Jun. 4, 2015, the disclosure of which is hereby incorporated herein by reference in its entirety.

BACKGROUND

Many websites, in particular sites with a registered user base (such as, e.g., online social networks), deliver both dynamic content (such as, e.g., custom content generated or assembled from a database based on user-specific information) and static content (such as, e.g., files made available for download). In order to facilitate dynamic content delivery and implement associated access restrictions, customizations, etc., network requests received by the site are often routed to a front-end processing layer (often written in PHP) that, in turn, communicates with the relevant back-end databases or other repositories (optionally via back-end database applications). The operations performed in the front-end processing layer may be computationally expensive and time-consuming, and, accordingly, care is usually taken to provide sufficient hardware resources to serve the anticipated load of requests from a site's users. However, network requests to a website are not generally limited to end-user visitors, but may also come from third-party websites that retrieve and/or link, in particular, to the static content provided by the sites. For example, files downloadable from a website may show up in the search results of a third-party search engine and be downloadable through the search engine, causing additional network traffic to the site without a corresponding increase in actual site visits. In some circumstances, such indirect traffic can grow to a level that puts a severe drain on system resources, slowing down request handling for all users and/or reaching maximum system capacity.

DESCRIPTION

Described herein, in various embodiments, are systems and methods for efficiently handling network requests for various kinds of content, as well as for leveraging file downloads from a website in a manner that re-captures some of the benefits associated with direct site visits. For example, in some embodiments, prior to delivery of a requested static file (e.g., a pdf document) to the requester, the file is augmented with dynamic or other enriching content available on the website. To create an augmented file, enriching content may be merged into a static document (herein understood to be an electronic document stored as a file and having a fixed layout, optionally structured into multiple pages, slides, frames, etc.), for instance, in the form of an additional page or as an overlay onto the existing pages. By augmenting static files available for download, a website may confer its own branding onto the file, and/or give (unregistered) end users at least a glimpse of the site's functionality, thereby enticing their visit to the site. The merged-in content may even include executable links that re-direct readers of the downloaded file to the website. Furthermore, in some embodiments, a unique identifier is embedded into each downloaded copy of the file (e.g., in the metadata, invisibly to the user), allowing distribution of the file to be tracked in certain circumstances, e.g., in the event a user follows a link contained in the file to the website or attempts to upload the file to the website. In one example embodiment, file augmentation is applied to research articles or similar publications, which may be rendered more useful, e.g., by adding a table of contents, including links to higher-resolution versions of images contained in the publication, or otherwise enhancing the publication based on its internal contents, and/or may be enriched with external content, such as consumption and other user-interaction statistics (e.g., assembled into a cover page added to the document), or links to references cited in the publication or to author profiles of its authors. Hereinafter, the term "enriching content" is used to broadly denote any content added to a static document, whether derived entirely from the internal contents of the static document (as is generally the case with, e.g., a table of contents) or based on external information, and whether it is truly dynamic (i.e., generally changing in time, as is the case with, e.g., user interactions statistics) or not (as is generally the case with, e.g., links to cited publications).

In accordance with some embodiments, the efficient handling of high volumes of network requests is enabled by processing requests for static content differently than requests for dynamic content to remove an unnecessary processing layer in the static-content prong, taking advantage of the fact that numerous operations performed by the front-end processing layer are superfluous in the delivery of static content (such as mere file downloads). This bifurcated approach can provide substantial computational-cost savings in the delivery of static content while maintaining full functionality for dynamic content. Further, it facilitates duplicating system resources configured to handle network requests for static content across multiple geographic regions to thereby facilitate greater speed in servicing the requests, without the need to also duplicate the system resources for handling requests for dynamic content (which might be prohibitively expensive). Further, the delivery of "hybrid" content containing both static and dynamic portions can be facilitated in a manner that retains at least some of the efficiency increases of the static-content processing prong. In particular, in accordance with some embodiments, downloadable document files requested by users (e.g., via third-party sites) are augmented with dynamic content, and the augmented content is delivered to the requester as a single file (as if static). In this case, the network request may be processed at least partially in parallel by a dynamic-content management system (which may be, or form part of, the front-end processing layer mentioned above) and a file repository and management system to retrieve the static file and the dynamic contents simultaneously (meaning, herein, overlapping in time) before the contents are merged into a single file.

Figure 1:
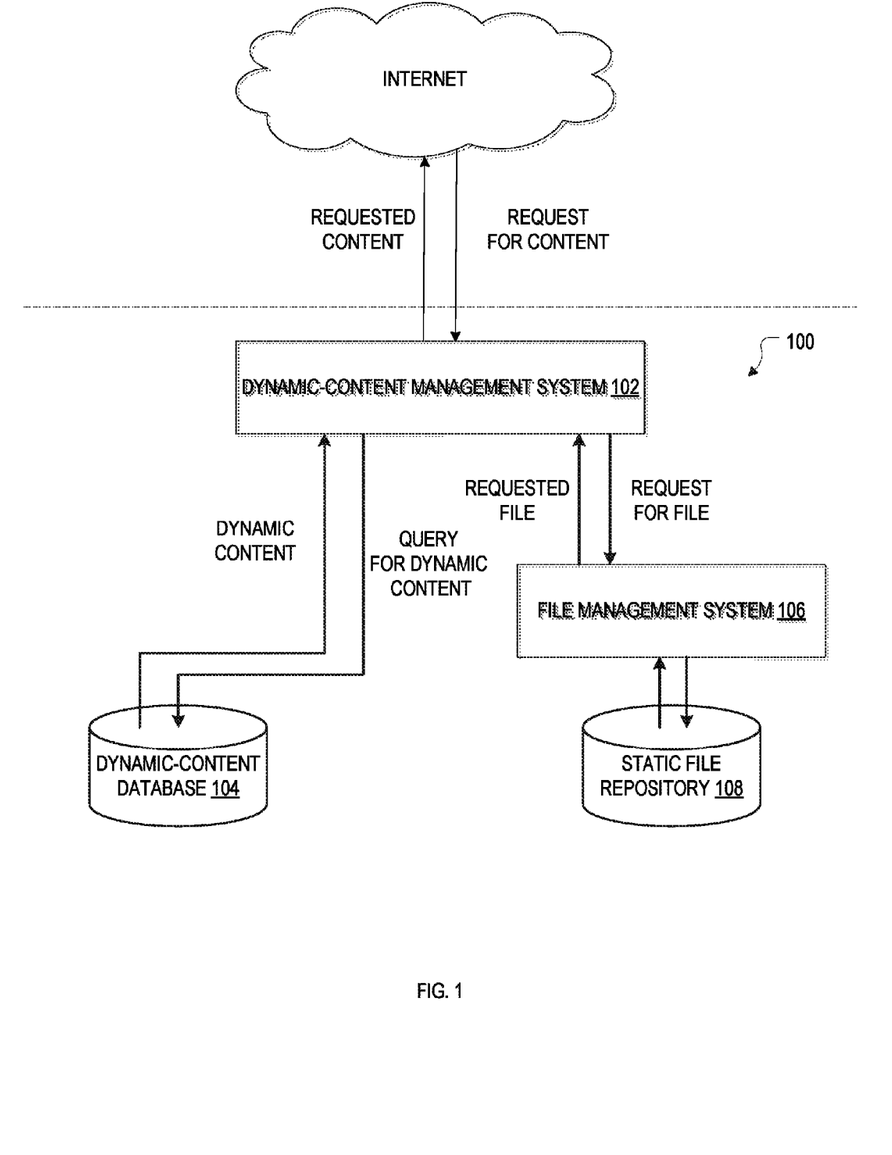
FIG. 1 is a block diagram illustrating an example system architecture for processing network requests for dynamic and/or static content.

The foregoing will be more readily understood from the following description of the accompanying drawings. For context, FIG. 1 illustrates a conventional architecture for processing network requests for dynamic and/or static content (including, e.g., dynamic content with embedded static content). The depicted network-server system 100 (which may include multiple machines) includes one or more instances of a front-end (e.g., PHP-implemented) processing layer including a dynamic-content management system 102; in the case of multiple instances, a load balancer (not shown) may distribute the incoming network request across these instances. The dynamic-content management system 102 may retrieve dynamic content from one or more dynamic-content databases 104 and static content, such as files, via a file management system 106 from a file repository 108 (the file management system and file repository herein also collectively being referred to as a "file repository and management system"), and may then assemble and convert the retrieved contents into a single delivery unit, e.g., in many cases, a web page. In doing so, the dynamic-content management system 102 may also implement any authentication procedures, access restrictions, customizations, etc. As shown, handling a network request in this architecture involves a complete round trip through the dynamic-content management system 102, and the dynamic-content database 104 and/or file repository and management system 106/108—this is the case even if the network request is for a single static file only.

Figure 2:
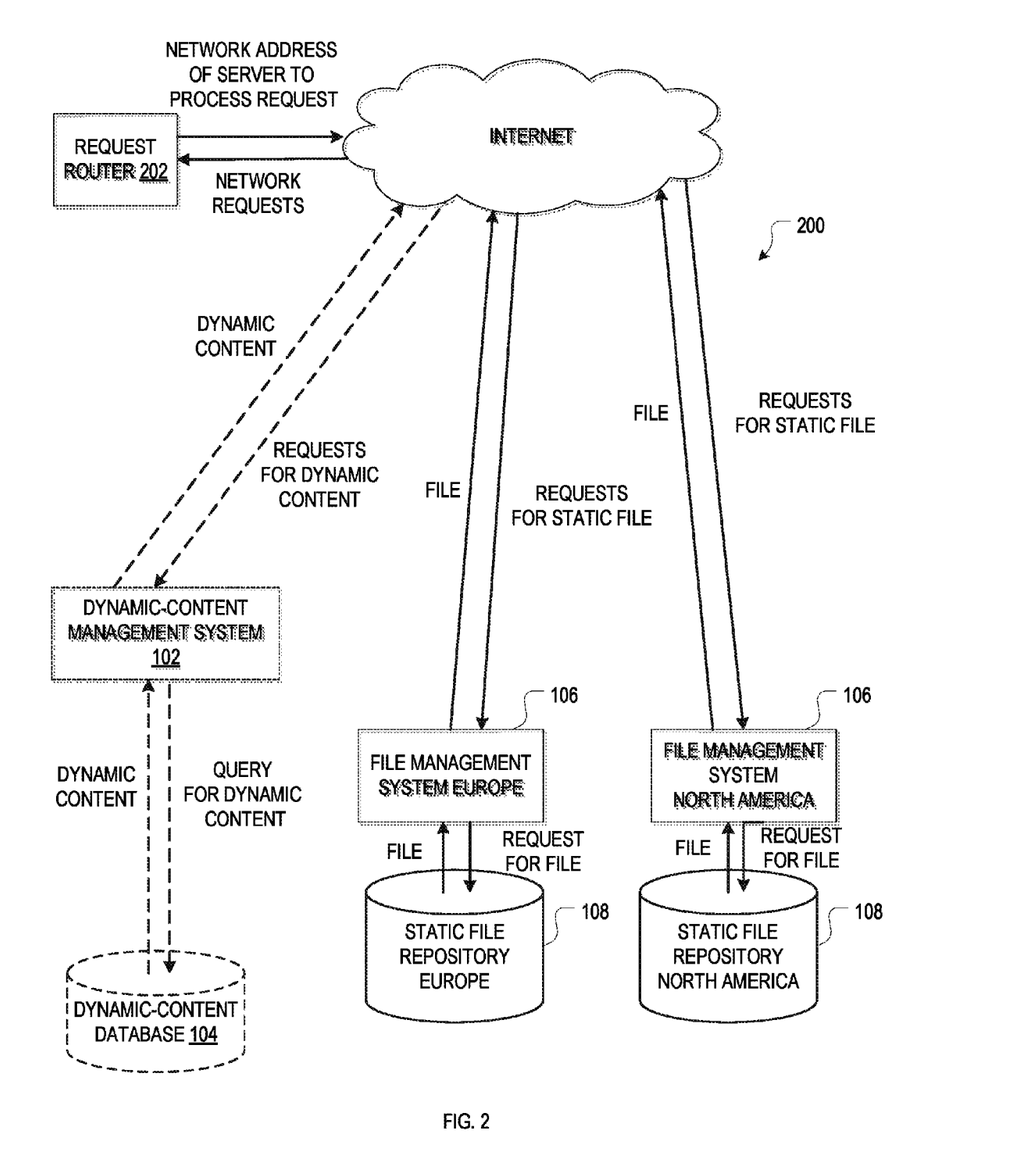
FIG. 2 is a block diagram illustrating an example bifurcated system architecture for processing network requests for static content differently than requests for dynamic content, in accordance with various embodiments.

FIG. 2 illustrates a bifurcated architecture for processing network requests for static content differently (and more efficiently) than requests for dynamic content. In this architecture, the network-server system 200 includes a request router 202 that determines whether an incoming network request from a client (the client viewed as being "in the cloud," i.e., the request being received via the Internet) is for static content or for dynamic content, and redirects the request accordingly. Requests for dynamic content (with or without embedded static content) are routed to the dynamic-content management system 102 (if applicable, via the associated load balancer), and handled in the same manner as described above with respect to FIG. 1. For network requests for static files, however, the dynamic-content management system 102 is circumvented, the request instead being sent directly to the file repository and management system 106/108 (if applicable, via that system's own load balancer). The file management system 106 may serve to perform basic access-management functions, such as redirecting the request if the requested file was moved, returning an error message if the requested file no longer exists or is otherwise unavailable, and/or enforcing some access restrictions. This functionality is, however, generally minimal compared with the functionality provided, and the operations performed, by the dynamic-content management system 102. Thus, by taking the dynamic-content management system 102 out of the processing prong for static content, substantial time savings can be achieved.

Furthermore, as illustrated, the file management system 106 may be replicated across different geographic regions (e.g., by implementing multiple replica in different data centers in Europe and in North America). This allows further speed-up in file delivery to the requesting client (whether that be an end-user device or a third-party service) by having the request router redirect requests to the file repository and management system 106/108 closest to the client's geographic location (thereby minimizing travel distance of the data across the network). The dynamic-content management system 102 and database 104 may, but need not, be also geographically distributed. In some embodiments, the dynamic-content management system 102 and database 104 are geographically distributed, but across fewer locations than the file repository and management system. For example, dynamic-content management systems 102 may be located in Europe and North America, and file repository and management systems 106/108 in Europe, North America, South America, and Asia. In this case, or in the case of a central dynamic-content management system and database 102/104, the geographically distributed file repository and management systems 106/108 would not provide the desired time savings but for their depicted isolation from the dynamic-content management system 102 (i.e., it would not make sense to direct requests for files to a file repository and management system 106/108 closer to the client if the files are returned to the client, in accordance with FIG. 1, via a dynamic-content management 102 system farther away).

Figure 3:
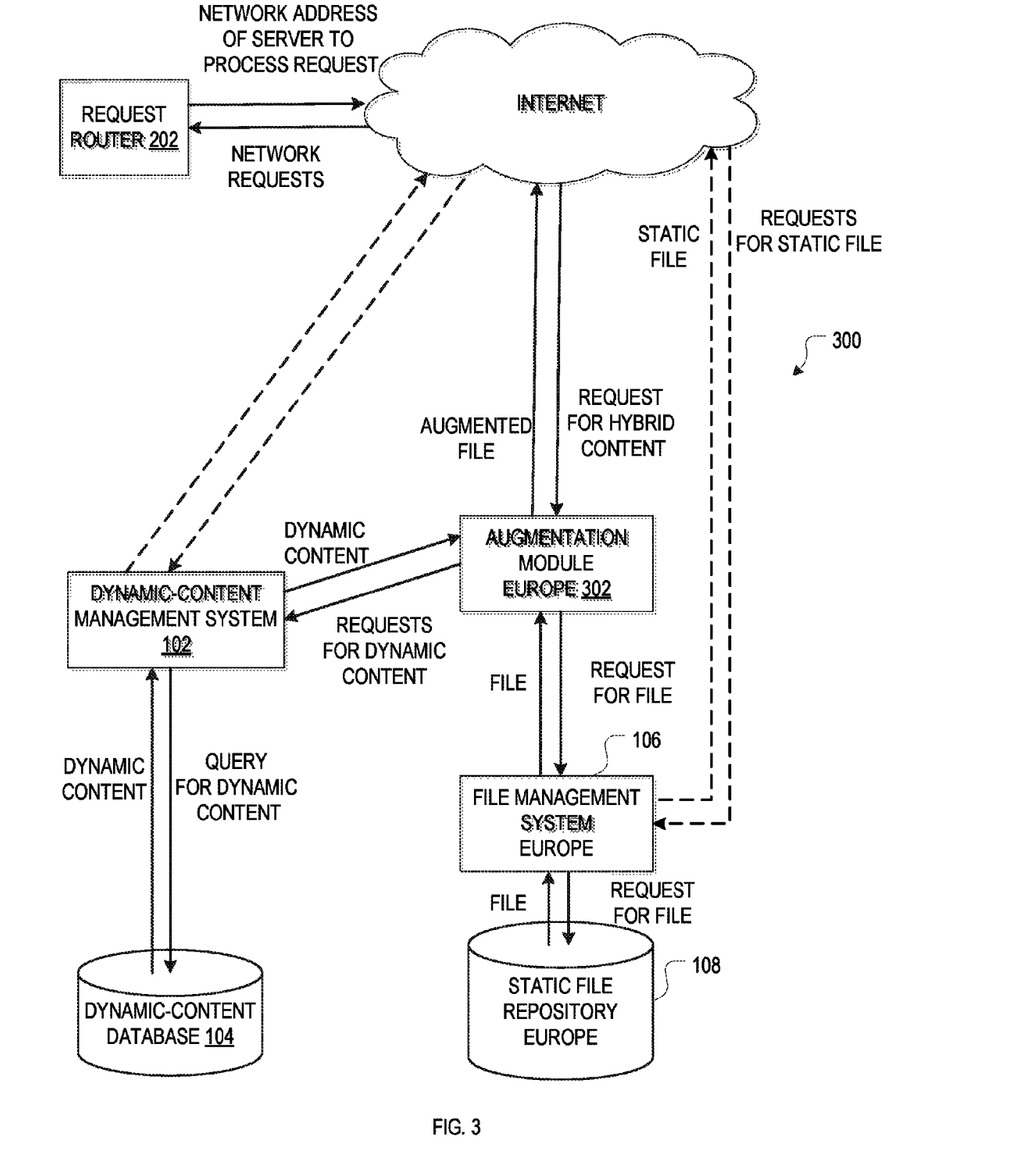
FIG. 3 is a block diagram illustrating an example bifurcated system architecture for merging dynamic content into a static file, in accordance with various embodiments.

FIG. 3 illustrates a modified bifurcated architecture for merging dynamic content into a static file, in accordance with various embodiments. Herein, network requests for files that the network-server system 300 is designed to augment with dynamic content are directed (again, possibly via a load balancer) to an augmentation module 302 associated with the file repository and management system 106/108. (In case of multiple geographically distributed file repository and management systems 106/108, a replica of the augmentation module 302 would be co-located with each of the systems 106/108. For clarity of depiction, FIG. 3 shows, by way of example, only the augmentation module 302 and file repository and management system 106/108 for Europe. The functionality and communications with the dynamic-content management system 102 are the same for any replica.) The augmentation module 302 forwards the request in parallel to the file management system 106 and the dynamic-content management system 102. While the file management system 106 retrieves the requested file, the dynamic-content management system 102 retrieves dynamic content associated with the requested file (based, e.g., on an identifier of that file contained in the request from the augmentation module 302). For example, within an online social-network and publication system, the requested file may be a publication (e.g., a research article), and the dynamic content may be or include statistics on user interactions with the publication (e.g., numbers of views, downloads, citations, comments, etc.), or links to profiles of authors of the publication or other articles cited in the publication. By obtaining the static and dynamic contents in parallel, the system may realize substantial time savings, notwithstanding the fact that the dynamic content may be retrieved, in some circumstances, from a location remote to the augmentation module 300. In fact, for large static files, their (local) retrieval may take an amount of time comparable to the time the (remote) retrieval of relatively small supplemental files takes.

The dynamic-content management system 102 returns the dynamic content to the augmentation module 302, which merges the dynamic content into the requested static file to create an augmented file. In some embodiments, the dynamic-content management system 102 assembles the retrieved dynamic content, prior to forwarding to the augmentation module 302, into a page—but instead of generating a web page (as it may usually do in response to a request received at the website itself, it generates a (for example, one-page) file of the same format (e.g., pdf) as the requested static file, and sends it as a supplemental file to the augmentation module 302. The augmentation module can then simply append the supplemental file to the (raw) requested static file (e.g., by adding the contents of the supplemental file as a cover page) to create the augmented file. In other embodiments, the augmentation module 302 receives raw dynamic content from the dynamic-content management system 102, optionally along with coordinates within the static file to which each piece of dynamic content pertains, and creates an overlay onto the static file to create the augmented file. Whichever way created, the augmented file is then delivered to the requesting client. By providing the client with a single file including both the requested static content as well as dynamic content added by the system 300, the system 300 can provide non-visiting end users with an experience similar, in some respects, to those of visitors to its website, and thereby implicitly inform those users of some of the site's capabilities. The augmentation module 302 may, further, cache the augmented file for subsequent retrieval in response to a repeat request for the same file. The cached files may have an associated expiration date based on the time period through which the dynamic content is deemed to be relevant. After expiration, the cached augmented files may be deleted.

As illustrated in FIG. 3 with dashed lines, a system for generating hybrid content in the form of augmented files as described above may also be able to service requests for purely static files or conventional dynamic content. Requests for static files may simply be sent directly to the file repository and management system 106/108, and requests for dynamic content may be sent directly to the dynamic-content management system 102.

While the above description of FIG. 3 refers specifically to the merging of static and dynamic content, to which bifurcated processing is particularly relevant, the architecture of system 300 is generally more broadly applicable to the merging of any kind of enriching content (whether truly dynamic or not) into static files. (Thus, the dynamic-content management system and database 102, 104 could be re-labeled "enriching-content management system" and "enriching-content database.") Of course, in the case of purely static enriching content, i.e., content that does not change in time, the augmented file, once created, may be stored and re-used indefinitely, without an expiration date, circumventing the efficiency and capacity problems associated with creating hybrid dynamic/static content. In many practical applications of the augmentation methods described herein, "raw" static files are enriched with content that is at least partially dynamic, rendering the architecture of FIG. 3 beneficial. In the following, further aspects of creating and distributing augmented files, understood to be files augmented by any kind of enriching content (and not limited to dynamic content), are described.

In various embodiments, metadata, digital watermarks, or the like are embedded in the augmented files to mark them as such and/or facilitate tracking, or partially tracking, their dissemination. For example, in some embodiments, the enriching content may be marked (e.g., with metadata or a watermark), enabling the system to recognize the added content as such when it is later presented with a copy of the augmented file, and to remove the additions (e.g., the added cover page) if desired. For instance, when a user uploads a publication including a cover page with user-interaction statistics (which may, by the time of the upload, be far outdated), the file may be stripped of its cover page, avoiding outdated content to be propagated and/or multiple cover pages to be added over time. In some embodiments, a unique identifier is embedded in each copy of an augmented file sent to a client, and stored by the system in conjunction with information about the circumstances of the creation and/or delivery of the augmented file (e.g., a time stamp, information about the user that downloaded the file, etc.), allowing the distribution of the file to be tracked under certain circumstances. In some embodiments, information about the creation or delivery of the augmented file is directly embedded in the file; suitable such information (e.g., an identifier of the requesting user in conjunction with a time stamp) may itself serve as a unique identifier.

Figure 4:
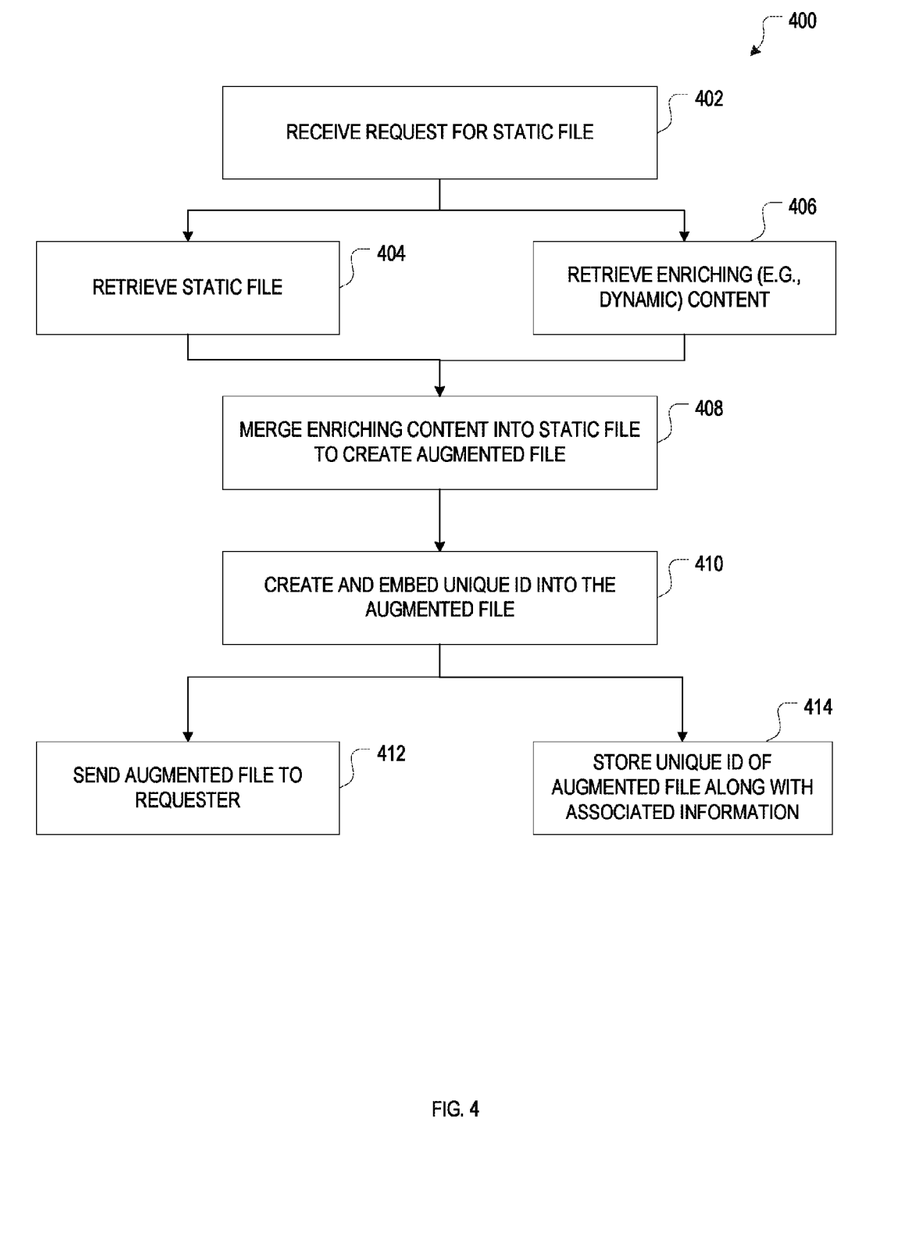
FIG. 4 is a flow chart of an example method for creating an augmented file including a unique identifier, in accordance with various embodiments.
Figure 5:
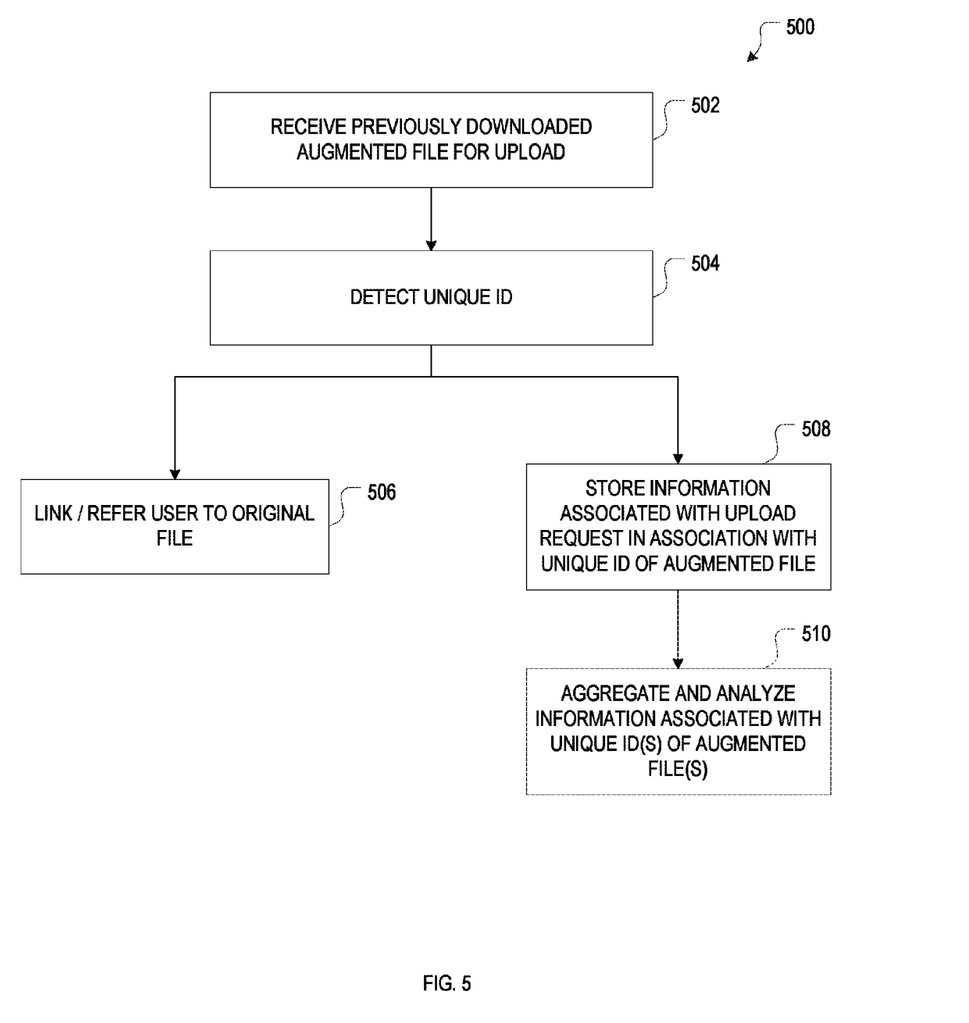
FIG. 5 is a flow chart of an example method for tracking distribution of the augmented file of FIG. 4 based on re-upload attempts, in accordance with various embodiments.
Figure 6:
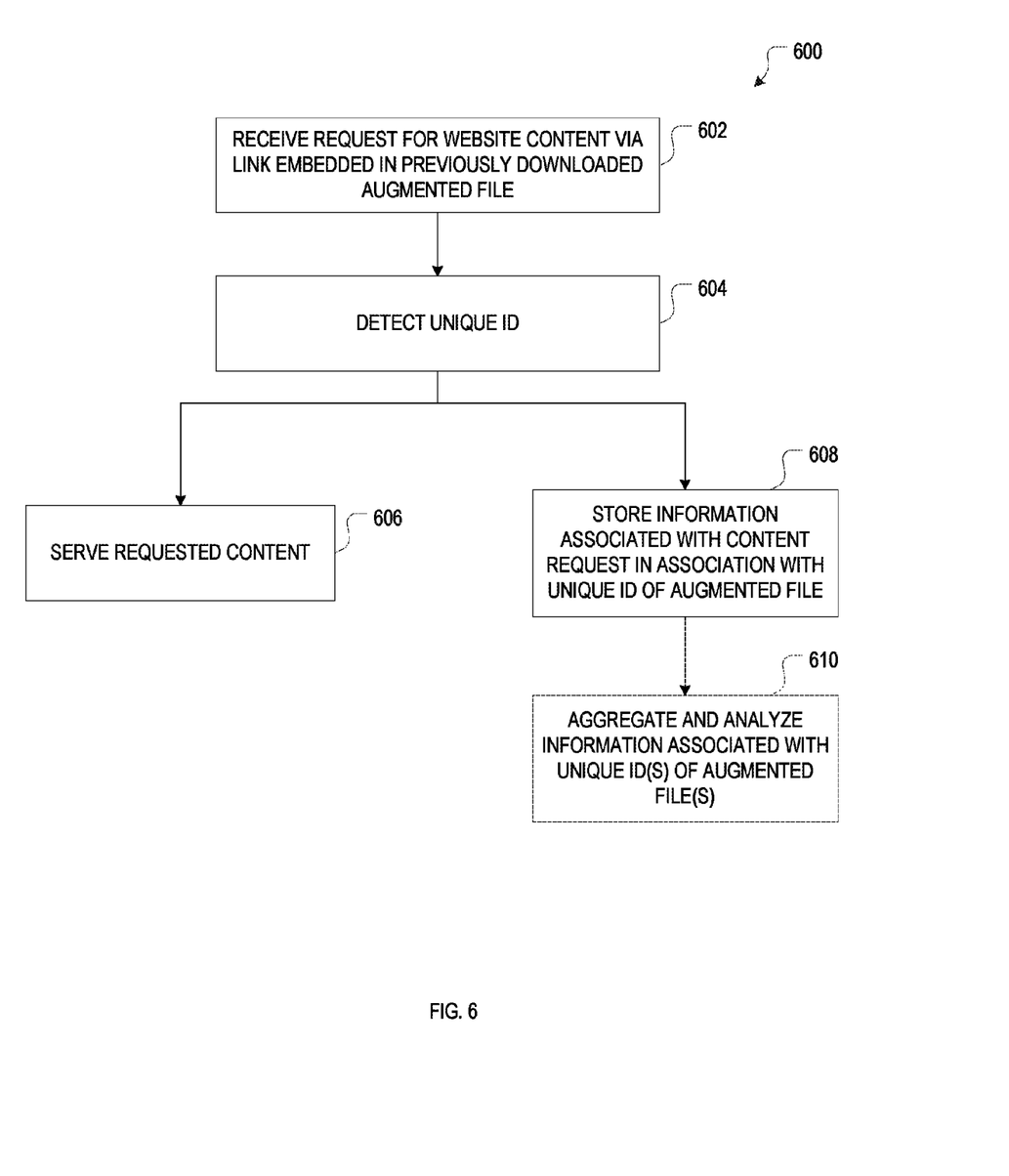
FIG. 6 is a flow chart of an example method for tracking distribution of the augmented file of FIG. 4 based on content requests originating from links contained therein, in accordance with various embodiments.

FIGS. 4-6 illustrate, in the form of flow charts, various embodiments for tracking augmented files based on unique identifiers. Beginning with FIG. 4, a method 400 for creating and delivering an augmented file is shown. The method 400 includes, in response to receipt of a (download) request for a static file (at 402), retrieving the file (act 404) as well as any related enriching (e.g., dynamic) content (act 406), and merging the enriching content into the static file to create an augmented file (act 408). As described above with respect to FIG. 3, retrieval of the static file and the enriching content may take place in parallel for efficiency. The method 400 further involves creating a unique identifier for the augmented file—more precisely, the individual copy of the augmented file (such that the same static file augmented by the same enriching content in response to two separate requests receives two different respective identifiers)—and embedding the identifier in the file, e.g., in the form of metadata or as a watermark (act 410). The augmented file with the embedded identifier is then sent to the requester (act 412), and the unique identifier is stored along with information associated with the request and/or the augmented file (act 414). The associated information may, for example, include a time stamp associated with receipt of the request or delivery of the augmented file; an identifier of the underlying static file and/or an inventory of the added enriching content; and/or information about the requesting user, such as, for a registered and logged-in user, an identifier of the user and/or known information about the particular user (e.g., an associated scientific discipline), or, for a user that is not logged into the system, any information that can be derived from the IP address of, or cookies stored on, the client device from which the request was received (e.g., a geographic location or institutional affiliation of the user, or site usage information such as keywords or topics of content viewed).

Following the download of an augmented file to the client device, the network-server system (e.g., system 300) can, in general, not directly track the usage and distribution of that file. Thus, while the server system can gather, e.g., consumption statistics (e.g., numbers of reads) for the same content if accessed on the website, it lacks knowledge of "offline" (meaning, in this context, outside the system) consumption. In some circumstances, however, the downloaded file induces user interaction with the network-server system in one form or another, allowing the system to indirectly obtain at least partial information about the distribution and usage of the file. FIGS. 5 and 6 illustrate two possible scenarios.

FIG. 5 illustrates a method 500 for tracking distribution of the augmented file generated in accordance with the method of FIG. 4 based on re-upload attempts, in accordance with various embodiments. If the system receives, from a user, a previously downloaded augmented file for upload to the website (at 502), it can discover that fact based on detection of the embedded unique identifier (act 504). Rather than allowing the upload and thereby duplicating content on the website, the system can simply include a link to the original file (e.g., the underlying static file, or a cached version of the augmented file), optionally after referring the user to that original file and confirming that it contains, indeed, the content she intends to upload (act 506). If the user wishes to post the file in its augmented form and the augmenting enriching content has changed, the system may also generate and/or link to an updated version of the augmented file; to do so, stored information about the type of enriching content that was added to the static file may be used. For instance, a cover page containing user interaction statistics may be substituted by a new cover page containing corresponding updated statistics, or a link to a web page where the information is kept up-to-date.

In addition to avoiding duplication of content, the detection of the unique identifier associated with a copy of an augmented file in a file submitted for upload may serve to draw inferences about the offline usage and distribution of the file. For a given unique file, information about each (re-)upload attempt may be stored in association with the identifier of the file (act 508); such information may be a simple upload-attempt count, or include further data such as, e.g., a time stamp and information of the uploading user. The information may be aggregated across upload attempts for the uniquely identified copy of the augmented file, across such copies for a certain underlying document (e.g., a single static document, or a particular augmented version of the document that was cached and served out multiple times), or across different documents, and analyzed for different purposes (act 510). For example, if both the downloading and uploading user of a particular copy are identifiable (e.g., by virtue of their registered-user credentials), the transfer of the file from the downloading to the uploading user (which may have been direct or indirect) establishes a social connection (which may be direct or indirect) between them. Detection of this connection may cause a social-network and publication system, for example, to automatically connect the two users within the social network, or to send them notifications suggesting that they connect in the social network. As another example, the number of upload attempts for a given document, aggregated across downloaded copies, may provide an estimate of overall offline consumption of the document, optionally broken up by geographic region or some other criterion for which information can be gathered from the upload requests. (For instance, each upload request for each copy may be scored as a "read" of the document, and knowledge of the fraction of reads that result in an upload attempt may serve to get an estimate of the total (detected and non-detected) offline reads.) The time stamps associated with the download of the augmented file and subsequent re-upload attempts may provide insight into the timescales at which documents are disseminated. Data aggregated across different documents may reveal general user behaviors, such as a tendency to review documents online (logged into the system) or offline. Further examples will occur to those of ordinary skill in the art given the benefit of the present disclosure. As will be appreciated, tracking distribution and usage of downloaded files based on re-upload attempts is not contingent upon the merging of additional content in to the original static file, but is generally applicable to any files into which unique identifiers are embedded at download, even if they are otherwise unaltered.

In some embodiments, as mentioned above, the augmented file includes links back to the web site from which the file was downloaded. For example, an augmented publication may link to the user profiles (on the website) of its authors; to cited publications, referenced products, proteins or DNA sequences, or any other kind of reference information available on the website; or to publication reviews, comments, related discussions or research posted on the website, to name just a few examples. FIG. 6 illustrates a method 600 for tracking distribution of the augmented file generated in accordance with the method of FIG. 4 based on content requests originating from such links contained in the augmented file, in accordance with various embodiments. The method 600 includes, upon receipt of such a content request (at 602), detecting that the request was made via a link embedded in a previously downloaded augmented file and determining the associated unique identifier (act 604). Apart from servicing the request by delivering the requested content (act 606), the system stores information associated with the content request in association with the unique identifier of the downloaded augmented file (act 608). The information associated with the content request may include, e.g., the simple fact that a link in the augmented file was executed, an identification of the particular link that was executed, a time stamp associated with the request, and/or information about the requesting user. This information, processed optionally in conjunction with the information stored (in act 414) about the download request for the augmented file, can be aggregated and/or analyzed (act 610) in similar manners as described for act 510 of FIG. 5. In addition, information about the links can be used to determine, for instance, which kinds of links tend to cause user traffic to the website, or which portion of a document a user was reading (as determined based on the location of the link within the document), which, in turn, may allow ascertaining the interests of the user.

Figure 7:
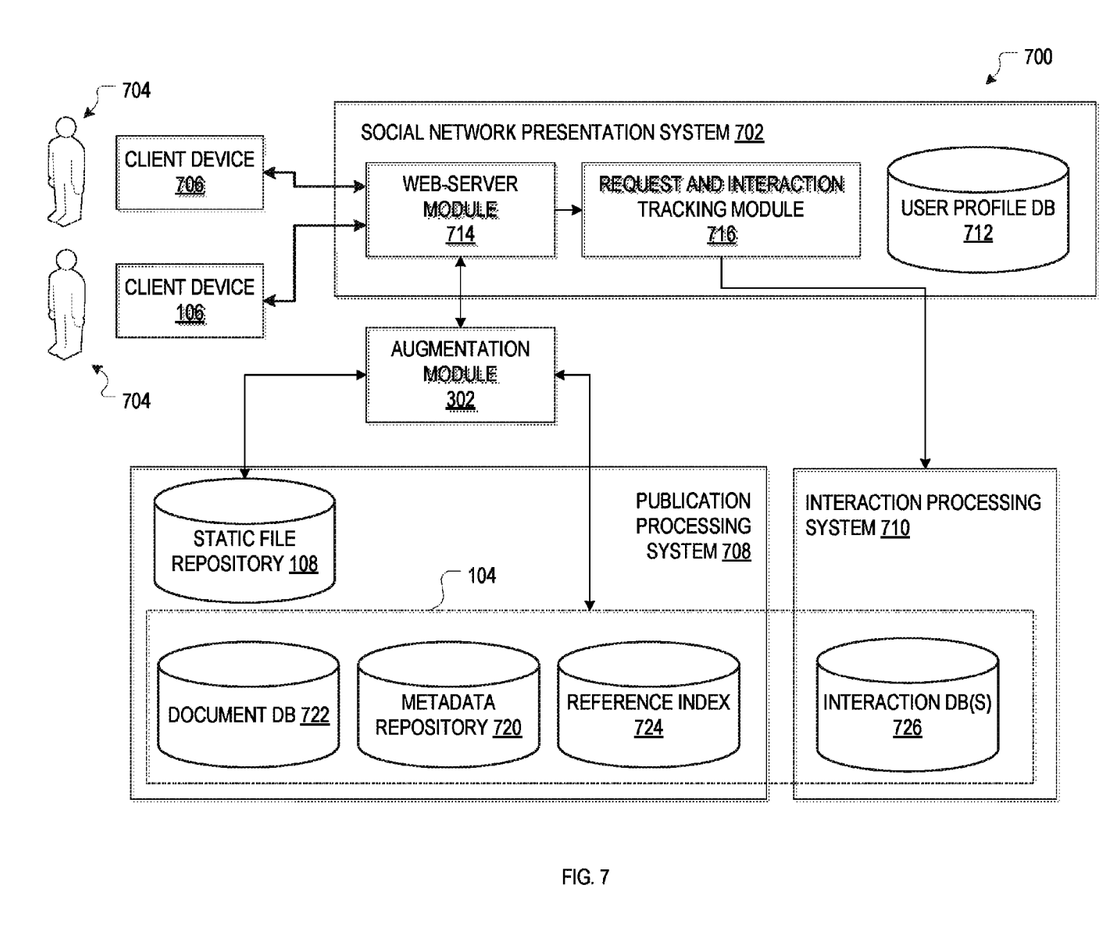
FIG. 7 illustrates an example social-network and publication system that can facilitate processing and augmenting an electronic document with enriching content, in accordance with various embodiments.

Various embodiments described herein involve the enrichment of a static document based on an analysis of its contents and/or related content available within a larger system, such as a social-network and publication system. For context, FIG. 7 illustrates an example social-network and publication system 700 in accordance with one embodiment. The system 700 includes, at its front-end, a social network presentation (sub-)system 702 through which users 704 at client devices 706 can access and interact with the content stored in the system 700. At the back-end, a publication processing (sub-)system 708 processes and stores electronic documents and related content and metadata, and an interaction processing system 710 stores and processes user-interaction data. The various subsystems 702, 708, 710 may be implemented on one or more computers (e.g., general-purpose computers executing software that provides the functionality described herein), such as a single server machine or a server farm with multiple machines that communicate with one another via a network (e.g., an intranet).

Via the social network presentation system 702, users may register on the system 700 by providing user-profile information (such as, e.g., a name, contact information, affiliation, interests, etc.) and establishing log-in credentials (such as, e.g., a user name and password). The user-profile information may be stored in a user-profile database 712. In some embodiments, eligibility to register as a user is limited to certain user groups, such as researchers, and based on certain corresponding conditions, such as academic credentials or publication records. Once registered, a user 704 may have the ability to upload her publications (e.g., research articles) or other documents to the system 700 via the social network presentation system 702. Alternatively or additionally, the system 700 may import publications from openly accessible third-party publication repositories (e.g., as provided on the web sites of many universities), and subsequently allow its users 704 to link their publications to their profile by claiming authorship. The publications or other documents may be processed and stored in the publication processing system 708. The social network presentation system 702 may include a web-server module 714 that receives user requests for content, and services these requests by retrieving the requested contents from the publication processing system 708 and delivering them, e.g., in the form of web pages or by enabling file downloads. The web-server module 714 may be in communication with or include a request and interaction tracking module 716 that extracts certain information about received network requests and user interactions with the served content, and forwards that information to the interaction processing system 710 for processing and storage thereat. In addition to the "raw" interaction data, the interaction processing system 710 may, for instance, generate and store counts of reads, downloads, citations to, comments on, or other types of interactions with the documents stored in the publication processing system 108.

The publication processing system 708 may store a received document in its entirety and as is in a static file repository 108, as well as process the document to extract, e.g., metadata (such as a title, authors, publication date and venue, etc.) or document elements (such as sections, images, formulas, etc.), which may be stored in a metadata repository 720 and document database 722, respectively. Further, the publication processing system 708 may maintain a (typically bidirectional) reference index 724 storing references contained in the documents to other content stored within the system 700; such references may include, e.g., citations of one publication by another, or links between an author listed on a publication and that author's user profile within the user profile database 712. The document database 722, metadata repository 720, and reference index 724, along with an interaction database 726 storing the raw and processed request and user interaction data in the interaction processing system 710, may collectively constitute, or form part of, the dynamic-content (or, more generally, enriching-content) database 104. In accordance with various embodiments, the system 700 includes, as an intermediate between the social network presentation system 702 and the publication processing system 708 when handling file-download requests, an augmentation module 302 that augments a static file retrieved from the static file repository 108 with content obtained from the enriching-content database 104.

Figure 8:
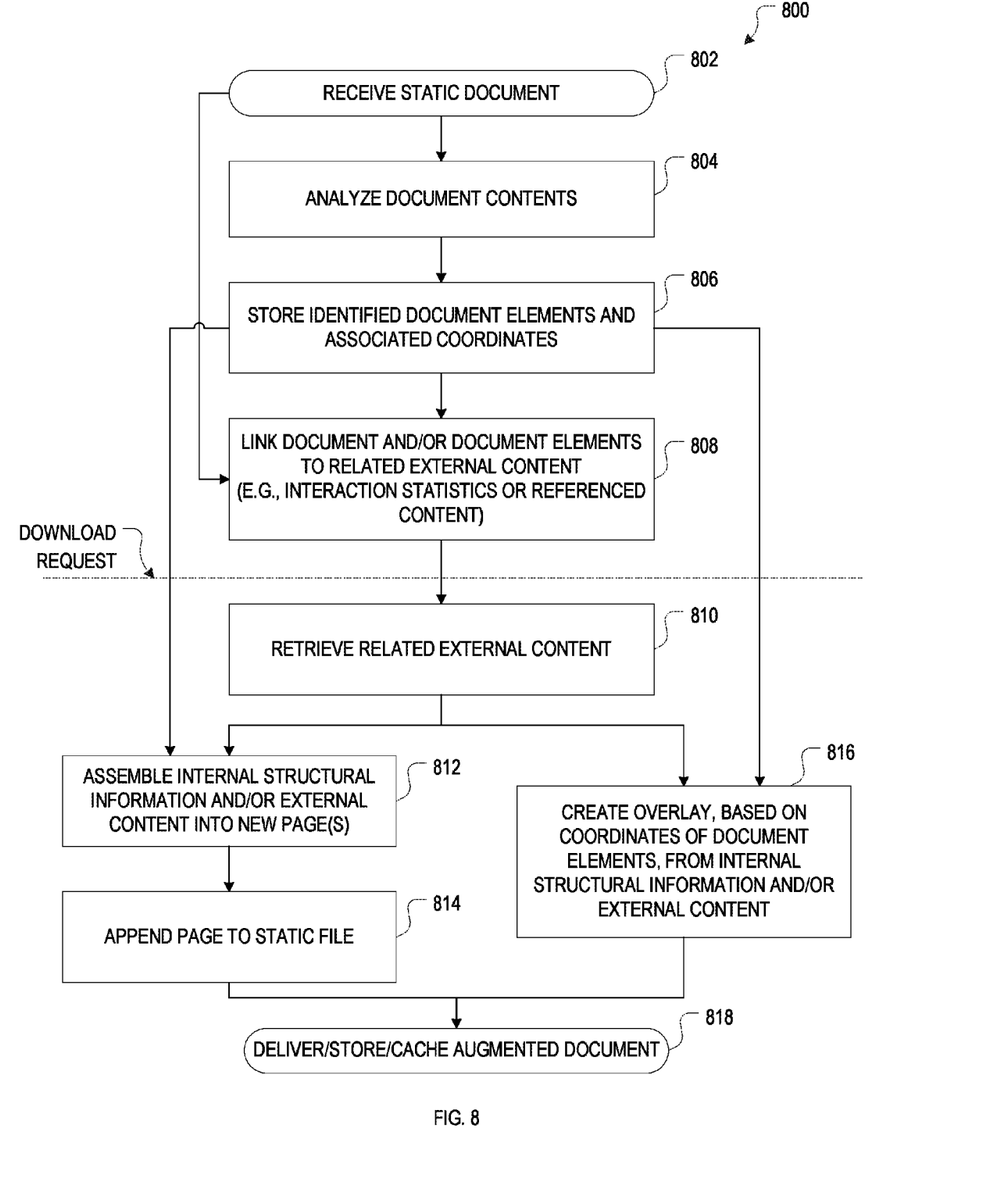
FIG. 8 is a flow chart of an example method for processing and augmenting an electronic document with enriching content, in accordance with various embodiments.

FIG. 8 is a flow chart of an example method 800 for processing and augmenting an electronic document with enriching content, in accordance with various embodiments; the method 800 may be implemented, e.g., using the example system 700 just described. The method 800 includes a number of actions (802-808) to extract and/or generate the enriching content, which are generally carried out prior to and independently of any request for the document, as well as a number of actions (810-818) to merge the enriching content with the original static document, which may be carried out in response to a request for the document, in particular, when the enriching content is at least in part dynamic in nature.

In more detail, upon receipt, at 802, of a new static document (e.g., at a publication processing system 708) and storage thereof in the static file repository 108, the document contents are analyzed to discern the structure of the document and/or identify certain document elements (act 804). The identified document elements and their coordinates within the static file (e.g., specified in terms of a page number and x-y coordinates within the page) are stored (act 806) (e.g., in document database 722). In some embodiments, the document is dissected in its entirety into a set of constituting elements—such as, e.g., paragraphs of text, images, tables, specially formatted text portions like citations, etc.; the level of granularity with which a document is broken up into such elements (e.g., section vs. paragraph vs. sentence vs. word) may vary between embodiments. For example, the publication processing system 708 may include functionality for converting documents provided in the form of unstructured, static files (such as, e.g., pdf documents) into a highly structured format internal to the system, in which each document is represented in terms of document elements stored as entries of the document database 722, the document as a whole being represented as an ordered list of its elements. Some of the elements, such as images, may have contents contained in individual binary files (which may not be amenable to further meaningful subdivision), which may be stored along with the static documents in the static file repository 108 and linked to by the database entries of the respective elements. In some embodiments, the document is not broken up into and stored as a sequence of documents elements, but is instead analyzed to identify and locate only certain types of elements, such as citations or figures, which may be entered into the document database 722, while the document as a whole is stored as a single file in file repository 108. Documents in pdf format, for example, can sometimes be difficult to convert into a fully structured format, e.g., because of uncertainties in the automated determination of the text flow in some implementations. However, partial or coarse structural information about the document may be obtained from the distinctive formatting of some elements (such as different or larger fonts for section headings, bracketing of citations, etc.), and may be used, in accordance herewith, to generate document elements. By storing the location of the extracted document elements within the document in association with the elements (act 806), the document elements can be properly placed within the larger document.

The method 800 may further include linking relevant external content to the document as a whole or to individual document elements (act 808). For example, in some embodiments, one or more of the identified document elements are citations to other documents; to the extent such cited documents are available within the system, links to their locations (e.g., in the form of uniform resource locators (URLs)) may be stored along with the respective document elements. Similarly, if the system has information (e.g., in dictionaries or other information repositories) about any other kind of object (e.g., authors, products, companies, chemicals, etc.) mentioned or referenced in the document, links to such information may be stored in association with the referencing document elements. Relevant external content may also include user-interaction statistics (e.g., the number of reads or downloads of a document, the number of annotations to document portions, etc.), which may apply to the document as a whole or to individual document elements.

In response to an event triggering augmentation of a static document, such as a download request, the external enriching content can be retrieved (act 810) and merged into the static file (acts 812-816). Alternatively or additionally, structural (or other) information internal to the document and discerned from its analysis can be used to enrich the document. For example, if a number of document sections and/or sub-sections have been identified in the course of the analysis (in act 804), a table of contents can be generated from the extracted section titles (without any need for external content) and inserted into the document, increasing the readability and navigability of the document, in particular, if the number of sections and sub-sections is large. Merging the enriching internal and/or external content into the static file can be accomplished in different ways. In some cases, illustrated as one prong of the method 800, the enriching content is assembled into one or more new pages (or slides, frames, etc.) having the same file format as the static file (act 812), and this page or these pages are then appended to the static file (act 814). In other cases, illustrates as a second prong of method 800, an overlay onto the static file is created from the enriching content (act 816). In the overlay, enriching content relevant to a particular document element are placed on (or adjacent to) that document element, based on knowledge of the coordinates of that document element within the document layout. For example, a citation to another document can be rendered clickable by overlaying a box including an underline onto the citation text and rendering the box executable as a link to the cited document. A number of commercially available or open-source tools for editing static files by creating overlays exist, and can be straightforwardly used to implement act 816. Once an augmented file has been created by appending additional pages or overlaying enriching content on the static file, the augmented file is ready for delivery to the requester as well as, if desirable, for cashing or permanent storage (act 818).

Certain embodiments are described herein as including a number of logic components or modules. Modules may constitute either software modules (e.g., code embodied on a non-transitory machine-readable medium) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 9:
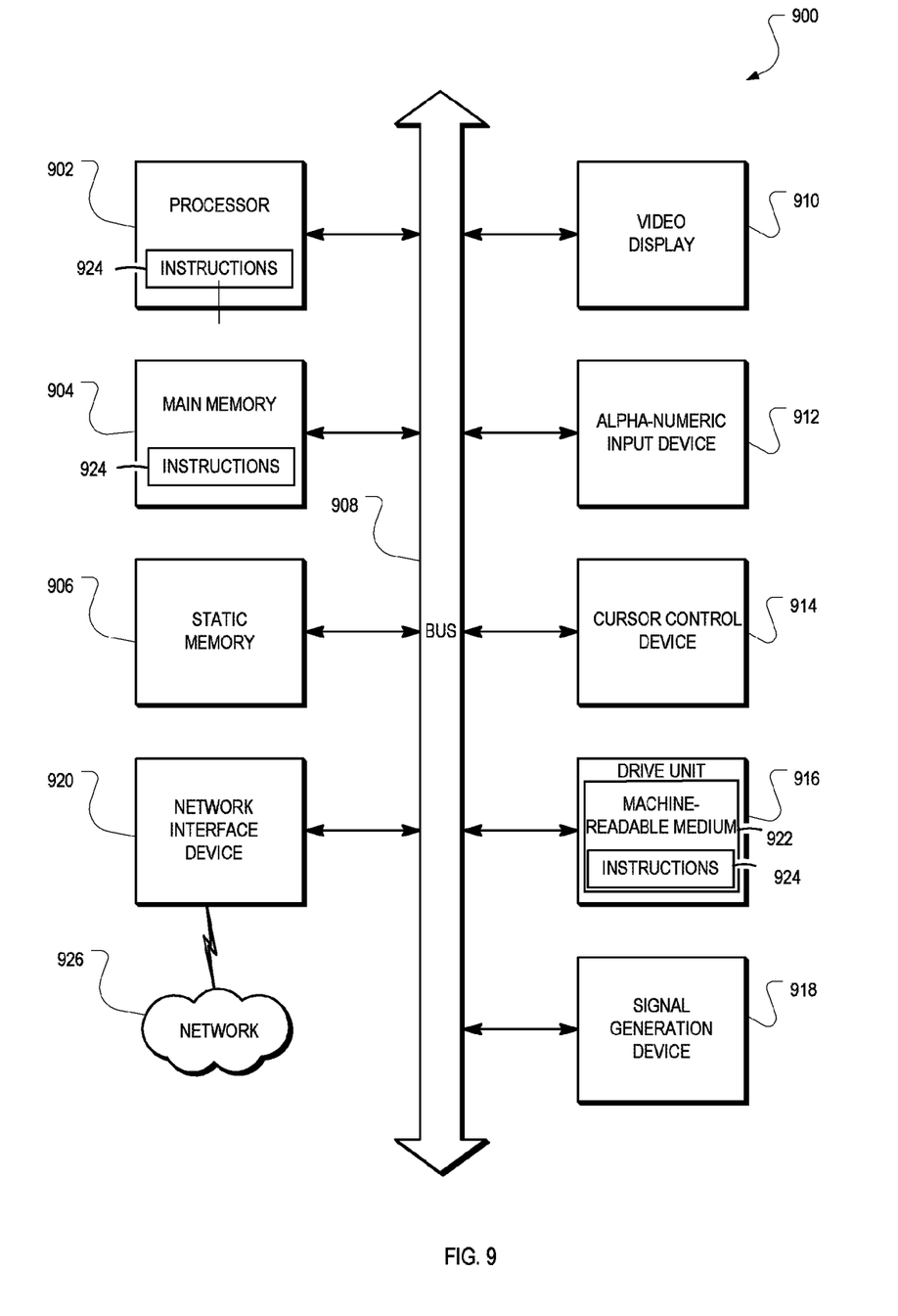
FIG. 9 is a block diagram of a machine in the example form of a computer system within which instructions for causing the machine to perform any one or more of the methodologies discussed herein may be executed.

FIG. 9 is a block diagram of a machine in the example form of a computer system 900 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server in server-client network environment, or as a peer machine in a peer-to-peer (or distributed) network environment. While only a single machine is illustrated, the term "machine" shall also be taken to include any collection of machines that individually or jointly execute a set (or multiple sets) of instructions to perform any one or more of the methodologies discussed herein. The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a disk drive unit 916, a signal generation device 918 (e.g., a speaker) and a network interface device 920.

The disk drive unit 916 includes a tangible machine-readable medium 922 storing one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting tangible machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The terms "machine-readable medium" shall also be taken to include any tangible medium that is capable of storing, encoding, or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks; or other hardware data storage devices.

Although the invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    at a network-server system,
        in response to a plurality of file download requests from one or more clients for an electronic file, embedding respective identifiers unique to the requests in respective copies of the electronic file; and electronically transmitting the copies of the electronic file with the respective embedded unique identifiers to the one or more clients; and
        tracking distribution or usage of the electronic file outside the network-server system based on detection of at least some of the unique identifier in network requests, received at the network-server system, that each originate from or include one of the transmitted copies of the electronic file.

2. The method of claim 1, wherein at least one of the network requests comprises one of the transmitted copies of the electronic file, submitted by a user in an attempt to upload the copy of the electronic file to a server in the network-server system.

3. The method of claim 1, wherein the network requests comprise a content request caused by execution of a link embedded in one of the transmitted copies of the electronic file.

4. The method of claim 1, further comprising retrieving copies of a static electronic file responsive to the downloads requests from a file repository and augmenting the copies of the static electronic file with associated enriching content prior to transmitting them with the embedded unique identifiers.

5. The method of claim 4, further comprising retrieving the enriching content from a database in parallel with retrieving the copies of the static electronic file from the file repository.

6. The method of claim 4, wherein the static electronic file is an electronic document comprising one or more pages, and wherein augmenting the copies of the static electronic file comprises generating one or more additional pages from the enriching content, and appending the one or more additional pages to the copies of the electronic document.

7. The method of claim 4, wherein the static electronic file is an electronic document having a fixed layout, and wherein augmenting the copies of the static electronic file comprises generating an overlay on the fixed layout, the overlay comprising the enriching content.

8. The method of claim 4, wherein the static electronic file is an electronic document, the enriching content comprising at least one of a link to external content for objects referenced in the electronic document, statistics on user interactions with the electronic document, or structural information determined from an analysis of the electronic document.

9. The method of claim 4, further comprising, following a first one of the download requests, caching the respective copy of the electronic file as augmented with the enriching content prior to embedding the respective unique identifier, and, in response to subsequent ones of the download requests for the electronic file, retrieving the cached augmented copy of the electronic file and embedding separate respective unique identifiers therein prior to transmission.

10. The method of claim 1, wherein tracking distribution or usage of the electronic file comprises scoring an offline read of the electronic file for each received network request originating from or including one of the transmitted copies of the electronic file.

11. The method of claim 1, further comprising storing at the network-server system, in association with the unique identifiers, information associated with the file download requests and information associated with the network requests originating from or including one of the copies of the electronic file.

12. The method of claim 11, wherein the information associated with the file download requests identifies one or more first users requesting the respective file downloads via the one or more clients and the information associated with the network requests originating from or including one of the copies of the electronic file identifies one or more second users issuing the respective network requests, wherein tracking distribution or usage of the electronic file comprises establishing social connections between each pair of a first user and a second user associated with a download request and network request, respectively, that are associated with the same unique identifier.

13. One or more hardware data storage devices storing instructions that, when executed by one or more hardware processors, cause the one or more processors to:
  embed, in response to a plurality of file download requests from one or more clients for an electronic file, respective identifiers unique to the requests in respective copies of the electronic file, and electronically transmit the copies of the electronic file with the respective embedded unique identifier to the one or more clients; and
  track distribution or usage of the electronic file based on detection of at least some of the unique identifiers in network requests each originating from or including one of the copies of the electronic file.

14. The one or more hardware data storage devices of claim 13, wherein the instructions further cause the one or more processors to retrieve copies of a static electronic file responsive to the download requests from a file repository and augment the copies of the static electronic file with associated enriching content prior to transmitting them with the respective embedded unique identifiers.

15. The one or more hardware data storage devices of claim 14, wherein the static electronic file is an electronic document comprising one or more pages, and wherein the instructions cause the one or more processors to augment the copies of the static electronic file by generating one or more additional pages from the enriching content, and appending the one or more additional pages to the copies of the static electronic document.

16. The one or more hardware data storage devices of claim 14, wherein the static electronic file is an electronic document having a fixed layout, and wherein the instructions cause the one or more processors to augment the copies of the static electronic file by generating an overlay on the fixed layout, the overlay comprising the enriching content.

17. A system comprising:
  one or more processor-implemented modules configured to:
    embed, in response to a plurality of file-download requests from one or more clients,
    respective identifiers unique to the requests in respective copies of the electronic file,
    cause the copies of the electronic file with the embedded unique identifiers to be electronically transmitted to the one or more clients; and
    track distribution or usage of the electronic file based on detection of at least some of the unique identifiers in network requests each originating from or including one of the copies of the electronic file.

18. The system of claim 17, wherein the one or more processor-implemented modules comprise:
  a file management system configured to retrieve copies of a static electronic file responsive to the requests from a file repository;
  an enriching-content management system configured to retrieve enriching contents associated with the static electronic file from an enriching-content database; and
  an augmentation module configured to forward the file-download requests to both the file management system and the enriching-content management system, and to augment the copies of the static electronic file received from the file management system with the enriching content received from the enriching-content management system to thereby create augmented copies of the electronic file, and to embed the unique identifier in the augmented copies of the electronic file.

19. The system of claim 18, wherein the file management system and file repository and the augmentation module each comprises multiple geographically distributed replica, the system further including a request router configured to direct the network request to one of the multiple replica based on a geographic location of the client.

* * * * *